No. 771,947. PATENTED OCT. 11, 1904.
J. A. SWINEHART.
VEHICLE TIRE.
APPLICATION FILED NOV. 23, 1903.
NO MODEL.

WITNESSES:
W. B. Moser
C. A. Sell

INVENTOR.
James A. Swinehart
BY H. T. Fisher
ATTORNEY.

No. 771,947.

Patented October 11, 1904.

UNITED STATES PATENT OFFICE.

JAMES A. SWINEHART, OF AKRON, OHIO.

VEHICLE-TIRE.

SPECIFICATION forming part of Letters Patent No. 771,947, dated October 11, 1904.

Application filed November 23, 1903. Serial No. 182,258. (No model.)

*To all whom it may concern:*

Be it known that I, JAMES A. SWINEHART, a citizen of the United States, residing at Akron, in the county of Summit and State of Ohio, have invented certain new and useful Improvements in Vehicle-Tires; and I do declare that the following is a full, clear, and exact description of the invention, which will enable others skilled in the art to which it appertains to make and use the same.

My invention relates to improvements in wheel-tires; and the improvement consists in the construction of the tire and its associated elements, all substantially as hereinafter shown and described, and particularly pointed out in the claims.

One of the objects of the invention is to provide a tire for vehicle-wheels which can be rigidly secured in place upon the rim thereof, but which will be as readily and easily removed when occasion requires without injury to the tire or its parts.

Another object is to provide means within the tire to carry heat throughout the same, and thereby change the consistency or character of the tire or of a material within the tire.

Figure 1:
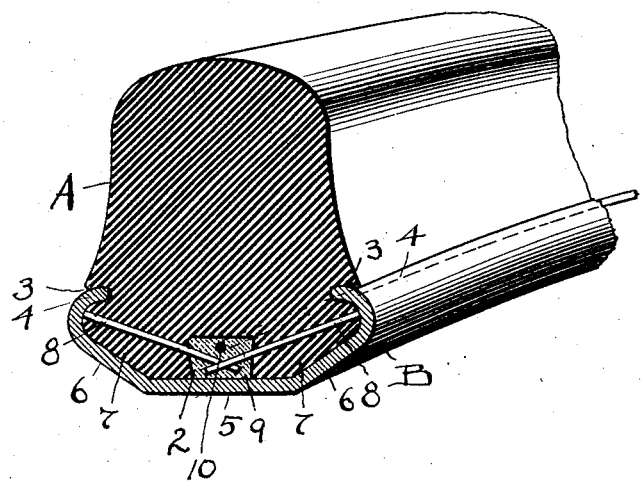
Figure 2:
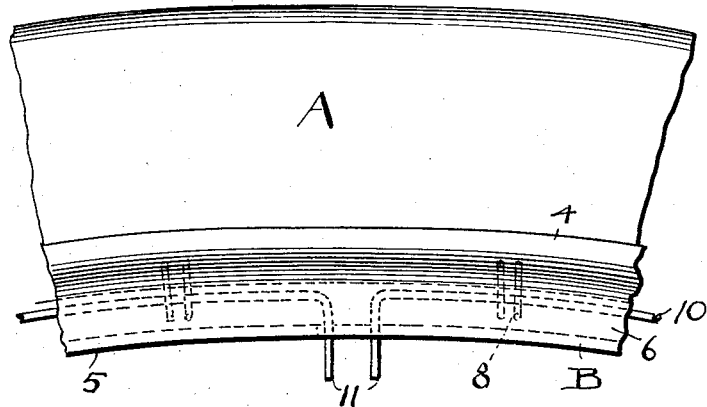
Figure 3:
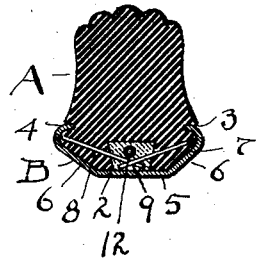

Referring to the drawings, Figure 1 is a cross-section and perspective view of a portion of the tire and the rim upon which it is fastened. Fig. 2 is a side view of a segment of the tire and rim of a wheel, showing the terminals or ends of the embedded wire used for heating purposes. Fig. 3 is a reduced cross-section of a tire and rim with a small tube in place of the wire shown in the other views.

Tire A is made up of solid rubber of such resiliency or yield as is ordinarily used, and the tread is of a U shape; but this shape can be variously modified. At the base or inner side of tire A, centrally beneath the tread portion thereof, is a dovetailed-shaped groove 2, which extends completely around the inner circumference of the tire, and a smaller endless groove or recess 3 is formed at each side of the tire, within which the inturned edges 4 of rim B are adapted to fit when the tire is pressed into place. Said rim is shown as having an inner flat bottom 5, with upwardly-flaring edges or walls 6, ending with the inturned edges 4. Rim B may be of metal or wood, or both, and may be variously formed or shaped without departing from the spirit of my invention. Groove 2 of tire A is of such relative depth and width as to permit portions 7 of said tire to be pressed inward between edges 4 of rim B when the tire is either secured upon the rim or removed therefrom. Cross-wires or wire nails 8 are embedded within portions 7 and project into groove 2, and the outer end of said nails 8 extend to a point beneath side grooves 3. These wires or nails are driven in from the sides at intervals all around the tire and serve to give the rubber solidity and strength at a point where the outward pull and strain upon the tire is greatest.

The construction as described up to this point serves in a measure to lock the tire in place upon the rim; but to completely and effectively secure the same in place against accidental stripping or removal I utilize a fusible cement or other like medium 9, which hardens of itself, or a material such as rubber, which can be cured by heat and hardened after the tire is in place upon the rim, and I place said cement or rubber in groove 2 while it is soft and pliable. In the event that a fusible cement is utilized groove 2 is completely filled therewith, and while it is still in a pliable or softened state the tire is squeezed or pressed into place between edges 4. After the cement has hardened the filled-in groove 2 becomes in reality a solid core, which locks side portions 7 of tire A in place between the sides and beneath edges 4 of rim B; but it is desirable in many instances to remove tire A from rim B without injuring said tire or rim, and to that end a wire 10 is threaded or inserted the full length of groove 2 before the cement or retaining compound is placed therein, and the terminals 11 of the wire extend through the rim at any suitable point where electrical connections can be made to send a current of electricity through wire 10 to heat the same. Usually a current governing or regulating device is attached to one terminal and a live feed-wire to the other terminal. Heating of wire 10 when thus accomplished will fuse the cement within groove 2 and reduce it again to a pliable state, which then permits the removal of tire A from rim B.

An obvious equivalent for a heating member within groove 2 is shown in Fig. 3, wherein a tube 12 takes the place of wire 10 and through which a heating agent is forced to accomplish the same result as heretofore described.

If desired, uncured rubber or rubber cement or any equivalent material can be used in place of a self-hardening cement or compound, and in this event wire 10 or tube 12 would be used to heat and cure the same to reduce it to a hardened state. It will thus be seen that the application of heat to the material within groove 2 either hardens or softens the material, and this is dependent upon the character or composition of the material used.

The invention broadly embraces the tire and a heat-conducting member therein and an inner core of material adapted to be changed in bodily consistency by the application of heat. Thus it is possible to take a tube-tire and place within it a wire or tube which is covered or wrapped with uncured mixed sponge-rubber and by the application of heat through the wire or tube cure said sponge-rubber within the tire. In this case compressed-air chambers will be formed within the tire, as is found in rubber sponges, and the air thus confined in a multiplicity of air chambers or cells will give a tire thus treated substantially the same resiliency as a single-tube tire. Another advantage of this construction rests in its durability and in its non-collapsible qualities, because when punctured the air released from one or a few small chambers or cells would not affect the tire as a whole or place it out of commission.

What I claim is—

1. The tire and a core therefor adapted to be changed in character by the application of heat, and means within said tire to heat said core, substantially as described.

2. In vehicle-wheels, the tire and a rim for supporting said tire, a heating member around said rim at the base of said tire and a locking medium within the rim and tire comprising a material changeable in body when subjected to heat, substantially as described.

3. A vehicle-tire of rubber provided with a continuous groove about its inner circumference and a locking medium therein of variable consistency and a series of stiffening-pieces disposed at intervals laterally through said tire and having their inner ends embedded in said locking medium, substantially as described.

4. As an article of manufacture, a vehicle-tire of solid rubber provided with stiffening cross-wires embedded therein, an endless groove at the base of said tire, cement filling said groove, and a heating member confined the full length of said groove in said cement, substantially as described.

5. The combination of a tire with a vehicle-rim, channels to confine the base of said tire, a groove in said tire between the sides of said rim, a locking material of changeable consistency in said groove, and a heating member embedded in said material and having terminals extending outside said tire for heating connections, substantially as described.

6. The combination of a rubber tire with a vehicle-rim to support the same, a groove in the base of said tire, stiffening members embedded in said tire at each side of said groove, a locking medium of changeable consistency in said groove, and a heat-conveying member within said groove, substantially as described.

7. In vehicle-tires, a rubber tire having an endless groove and a locking medium of variable consistency engaged in said groove, a rim supporting said tire and locked thereon along its sides and stiffening-pieces for said tire engaged at one end within the edge of said band and at the other end in said locking medium, substantially as described.

8. As an article of manufacture, a solid-rubber tire provided with an endless groove at its base and cement therein, a continuous groove around the tire at each side thereof, stiffening-wires in said tire beneath said side grooves, and a metallic band within said groove having heat-connecting terminals, substantially as described.

9. A vehicle-tire comprising a channeled rim, a rubber tire resting therein having a groove to contain a locking compound, a pliable cement confined within said groove and rim, and a heating element within said tire having heat connections outside said tire, substantially as described.

10. The vehicle-rim provided with inturned edges, in combination with a rubber tire seated within said rim and engaged at each side by said edges, a circumferential channel in the base of said tire, and a hardening-filler for said channel adapted to lock said tire within and beneath the edges of said rim, substantially as described.

11. In vehicle-tires, a rubber tire having a continuous channel at its inner circumference, in combination with a rim having inturned edges engaging the tire along its sides, metallic stiffening devices extending laterally through said tire from the sides beneath said rims and with their inner ends projecting into said channel, and means within said channel adapted to lock said devices against inward movement and to hold said tire in place within said rim, substantially as described.

12. In vehicle-tires, a rubber tire having an endless channel centrally in its inner circumference of greatest width at its base and with converging side walls, and a locking medium of changeable consistency in said groove and stiffening devices for the tire engaged at one end in said medium, substantially as described.

13. In vehicle-tires, a rubber tire having a continuous channel on its inner circumference, a locking medium of changeable consistency occupying said channel, a rim having inturned side edges engaging the tire along its sides, and metallic stiffening devices extending laterally through said tire and locked at one end in said medium and at the other end beneath the inturned side edges of the said rim, substantially as described.

14. The combination of a rubber tire with a vehicle-rim to support the same, a groove in the base of said tire, stiffening devices embedded in said tire at each side of said groove and a locking medium of changeable consistency in said groove, substantially as described.

In testimony whereof I sign this specification in the presence of two witnesses.

JAMES A. SWINEHART.

Witnesses:
R. B. MOSER,
A. N. MOSER.